United States Patent [19]

Sella

[11] Patent Number: 5,700,117
[45] Date of Patent: Dec. 23, 1997

[54] MACHINE TOOL FOR MACHINING PANELS AND PLATES

[75] Inventor: Giovanni Sella, Thiene, Italy

[73] Assignee: Essetre dI Sella Giovanni, Thiene, Italy

[21] Appl. No.: 640,167

[22] Filed: Apr. 30, 1996

[51] Int. Cl.[6] .................................................. B23B 35/00
[52] U.S. Cl. ........................ 409/164; 409/193; 409/219; 408/13
[58] Field of Search .............................. 408/13, 16, 91, 408/1 R, 69, 70; 409/164, 193, 219

[56] References Cited

U.S. PATENT DOCUMENTS

| 1,412,806 | 4/1922 | Klausmeyer | 409/219 X |
|---|---|---|---|
| 4,518,288 | 5/1985 | Cilindro | 409/219 |
| 4,585,379 | 4/1986 | Nagayama et al. | 408/13 X |
| 4,596,067 | 6/1986 | Raiteri | 408/13 X |
| 4,687,563 | 8/1987 | Hayes | 408/13 X |
| 5,123,789 | 6/1992 | Ohtani | 408/13 X |
| 5,354,153 | 10/1994 | Ottone et al. | 408/1 R |

FOREIGN PATENT DOCUMENTS 4444339  5/1995  Germany .

*Primary Examiner*—Daniel W. Howell
*Assistant Examiner*—Henry W. H. Tsai
*Attorney, Agent, or Firm*—Notaro & Michalos

[57] ABSTRACT

A machine tool for machining panels, plates and discs, is fitted with a number of workpiece clamping devices (10) that move along a work bench (20) of the machine tool. The machine tool has sensors (8) designed to detect the position of the clamping devices (10), and a unit (2) built into the operating head (15) of the machine tool, which engages the clamping devices (10) to move them to preset positions on the bench (20) by one or more relative movements between the head (15) and the bench (20).

9 Claims, 2 Drawing Sheets

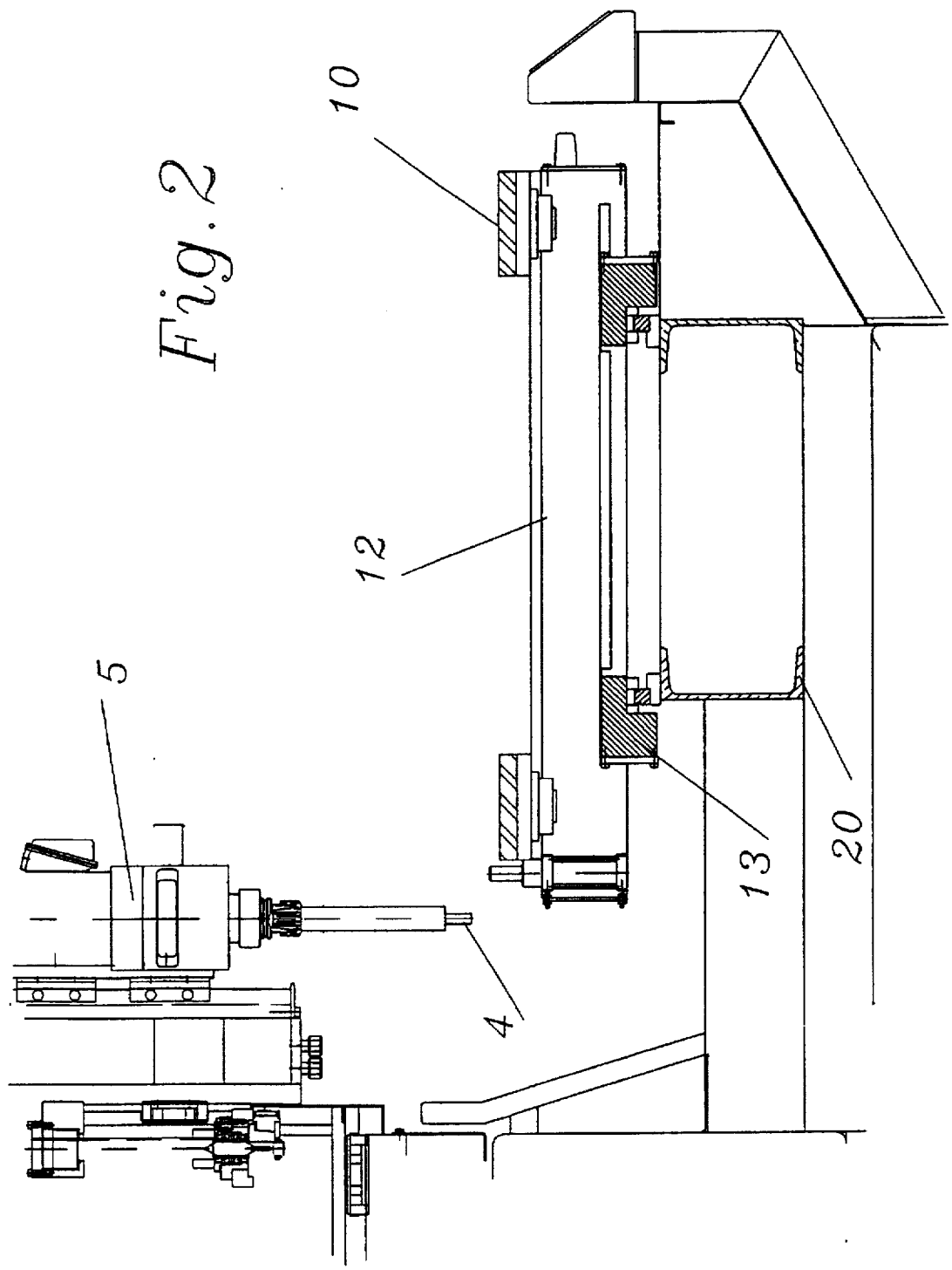

MACHINE TOOL FOR MACHINING PANELS AND PLATES

FIELD AND BACKGROUND OF THE INVENTION

The subject of this invention is a machine tool for machining panels and plates which is fitted with a number of workpiece clamping devices able to move along the work bench of the said machine tool.

The use of special machine tools such as cutting machines, flanging machines, vertical milling machines and machining centres in general is already known in the panel and plate machining field.

In machine tools, machining is effected by a combination of the composition of the movements of the work bench and/or the operating head.

The panels and plates are secured to the work bench by special clamping devices, preferably constituted by sucker blocks, ie. blocks containing one or more openings through which air is sucked to clamp the panels against the support during machining. Each block preferably has at least one ball which can partly emerge from the top surface as a result of the action of elastic equipment and/or pressurised air, and disappear below the level of the top surface as a result of the action of air suction devices.

During positioning of the panel to be machined, the said ball partly emerges from the support surface of the block; the operator can thus position the panel with minimal effort, as the friction produced is only rolling friction.

In some machine tools, the workpiece can also be positioned longitudinally with the aid of motor-driven belts.

These motor-driven belts can then descend vertically to prevent possible collisions with the tool during the operating stage.

The technique of fitting the clamping devices, suction blocks or workpiece holders to devices allowing them to move on the workbench is also known.

For example, the blocks in question can be fitted on first guides, parallel to the transverse axis of the machine tool bench, which engage second guides parallel to the longitudinal axis of the bench.

This system enables the blocks to be moved and locked in various positions, depending on the size of the panel and the areas to be machined, prevents these workpiece holders from interfering with the route of the cutting blade, for example in the case of cutting machines, and at the same time enables the workpiece to be exploited to the full by minimising machining waste.

The transverse guides are associated with devices, preferably pneumatic devices, designed to lock the transverse guides onto the longitudinal guides in the desired position.

Similarly, the blocks are associated with devices, preferably pneumatic devices, designed to lock the blocks onto the transverse guides in the desired position.

Currently, the transverse guides and clamping devices or blocks are positioned manually by the machine tool operator before a new production run is commenced.

The block positioning operation involves a considerable loss of time and a degree of skill on the part of the operator.

When frequent changes in production take place, ie. when the machine is used for small production runs or the semi-manufactured goods are of different sizes, the down time or stoppages caused by the necessary repositioning of the clamping devices seriously affects the total working time, and therefore the total production costs.

SUMMARY OF THE INVENTION

The main task of this invention is to eliminate these problems by offering a machine tool for machining panels and plates which accelerates positioning of the clamping devices.

An important purpose of this invention is to make a machine tool for machining panels and plates which eliminates the need for manual operations, enabling the said clamping devices to be positioned easily even by personnel who are not particularly skilled.

A further purpose of this invention is to offer a machine tool for machining panels and plates that includes a method of positioning the said clamping devices which is simple and cheap to manufacture.

All these tasks, which will be described in greater detail below, are performed by a machine tool for machining panels and plates of the type comprising a number of clamping devices which move along the work bench, in accordance with the characterising part of the annexed claims.

BRIEF DESCRIPTION OF THE DRAWINGS

Further characteristics and advantages of the invention will become clear from the description of a preferred, but not the only form of construction of the invention, illustrated by way of example but not of limitation in the annexed drawings, in which:

FIG. 2 is a side elevation of the machine shown in FIG. 1.

DESCRIPTION OF THE PREFERRED EMBODIMENT

Figure 1:
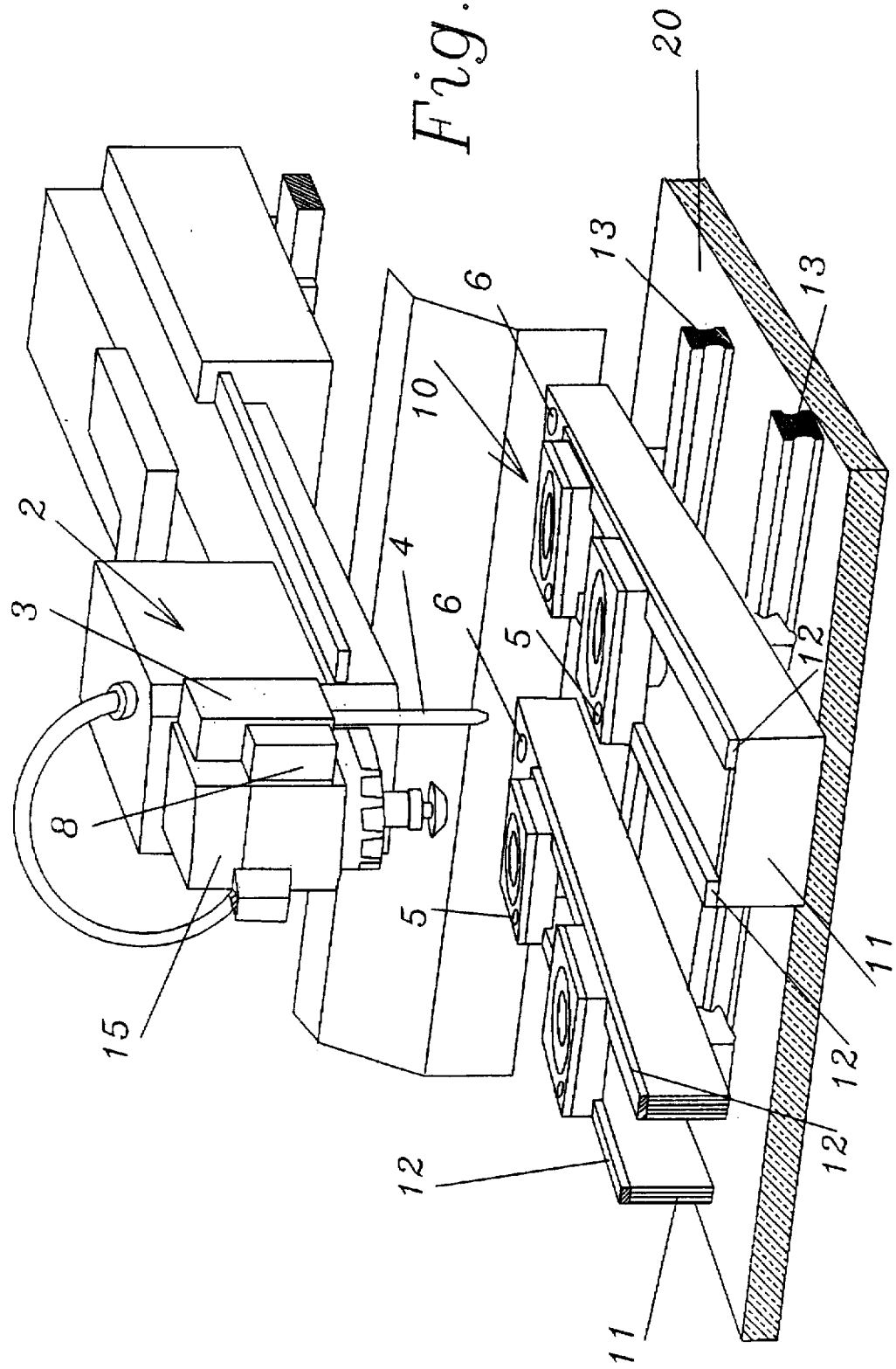
FIG. 1 is a perspective view of the machine tool in accordance with this invention.

With reference to the annexed figure, the machine tool in accordance with the invention comprises an operating head 15 which moves along a set of three Cartesian axes, and a fixed work bench or worktop 20.

Work bench 20 is fitted with a number of clamping devices or blocks 10, divided into sets of one or more blocks which move along first tracks or guides 12, parallel to the transverse axis of bench 20, the first tracks 12 being fitted on supports 11 which move along second tracks 13 parallel to the longitudinal axis of bench 20. Tracks 12 and 13 form orthogonal means for movement of the clamping devices over the work bench.

Supports 11 and first tracks 12 are locked in the desired position by locking devices (not illustrated), preferably of the pneumatic type, which lock supports 11 to work bench 20.

Similarly, clamping devices or blocks 10 are locked in the desired transverse position by means of locking devices (not illustrated), preferably of the pneumatic type, which lock block 10 to first tracks 12.

The above-mentioned locking devices are known, and will therefore not be further described.

Each clamping device or block 10 is connected to an air suction device (not illustrated) which firmly clamps the panel to block 10.

As already mentioned, it must be possible to position the panels in the most suitable manner on work bench 20 on the basis of the size of the panel and the job to be performed, in order to minimise machining waste and prevent the tool from colliding with block 10.

A characteristic feature of the invention is that it contains a unit 2, built into mobile operating head 15, which individually engages (i) first tracks 12, moving them to preset positions along the longitudinal axis of worktop 20, and (ii) clamping devices 10, moving them to preset positions along the transverse axis of work bench 20.

The movement of operating head 15 is preferably controlled by the machine tool's control unit.

In the form of construction illustrated, the unit 2 comprises a linear actuator 3 designed to engage and disengage a pin 4 in a first seating 6, which is integral with supports 11 and therefore with pair of guides 12, and in a second seating 5 integral with each clamping device or block 10.

This invention also contains sensors or sensor means 8 built into operating head 15, which precisely identify the longitudinal position of a first benchmark associated with each pair of guides 12 and, for each pair of guides 12, the transverse position of a second benchmark associated with each block 10.

On the basis of knowledge of the position of the first and second benchmarks, the operator or central unit can establish the position of the first seatings 6 and second seatings 5.

In a preferred form of construction the sensors will be the optical or inductive type.

The sensors are in any event of known type, and will therefore not be further described.

The machine operates as follows:

Data relating to the size of the material to be machined and the types of machining to be performed are input so that the central unit can calculate the ideal positions of blocks 10.

Sensors 8 scan bench 20 to establish the current positions of blocks 10.

More specifically, at the first stage the sensors, moved by head 15, perform a longitudinal scan of bench 20 to find the benchmarks associated with each support 11 and therefore with each pair of guides 12.

During the second stage, for each pair of tracks 12 the sensors perform a transverse scan of bench 20 to find the benchmarks associated with each block 10.

The computer thus determines the longitudinal position of each support 11, and therefore of each pair of tracks 12, and the transverse position of each block 10 associated with each pair of tracks 12.

At this point the computer calculates the longitudinal movements to be performed by each support 11, and therefore by each pair of tracks 12, and the transverse movements to be performed by each block 10 associated with each pair of tracks 12.

Finally, the control unit repositions blocks 10.

The repositioning of blocks 10 falls into two separate stages. In particular, at the first stage each support 11, and therefore each pair of tracks 12, is positioned longitudinally, while at the second stage blocks 10 associated with each pair of tracks 12 are positioned transversely.

More specifically, the first stage of repositioning of blocks 10 involves the following steps:

mobile head 15 moves pin 4 until it is perpendicular to seating 6 of the pair of tracks concerned linear actuator 3 lowers pin 4 until it engages the first seating 6 supports 11, and therefore the pair of tracks 12 concerned, are pneumatically released to allow their movement mobile head 15 performs the required longitudinal movement supports 11, and therefore pair of tracks 12, are locked in the new position linear actuator 3 raises pin 4 which retracts, disengaging seating 6.

More specifically, the second stage of repositioning of blocks 10 involves the following steps:

mobile head 15 moves pin 4 until it is perpendicular to seating 5 of the block concerned linear actuator 3 lowers pin 4 until it engages the first seating 5 the block 12 concerned is pneumatically released to allow its movement head 15 performs the transverse movement required to move block 10 to the desired position block 10 is locked in the new position linear actuator 3 raises pin 4, which disengages the second seating 5.

The machine tool is now ready to start the operating cycle.

This invention is particularly advantageous if implemented on numerical-control machines, where the operation of establishing the ideal positions of the clamping devices (10) and the operation of positioning the said devices 10 can be fully automated.

The invention thus designed could form the subject of numerous modifications and variations, all of which fall within the scope of the invention concept.

Thus, for example, sensors 8 could be fitted to each block 10.

Equally, the movement of blocks 10 could be both transversal and longitudinal, engaging pin 4 in seating 5.

Furthermore, if the panels and plates are made of ferromagnetic material, blocks 10 could be the magnetic type.

In practice, any materials or sizes can be used, as required.

I claim:

1. A machine tool for machining panels, plates and discs, the machine tool having a plurality of workpiece clamping devices (10) that move along a work bench (20) of the machine tool, the machine tool comprising:

orthogonal means (12, 13) for movement of the clamping devices (10) over the work bench (20);

an operating head (15) mounted over the orthogonal means;

sensor means (8) for detecting the position of said clamping devices (10); and a unit (2) built into the operating head (15) of said machine tool, which engages said clamping devices (10) and to move said clamping devices to preset positions on the work bench (20) by means of at least one relative movement between the operating head (15) and the work bench (20).

2. A machine in accordance with claim 1, wherein said sensor means (8) are integral with the operating head (15) of the machine tool.

3. A machine tool in accordance with claim 1, wherein said unit (2) which engages the clamping devices (10) includes a linear actuator (3) and a pin (4), said pin (4) being moved by said linear actuator (3) so as to engage and disengage at least one of (i) specific seatings (5) integral with the clamping device (10) and (ii) specific settings (6) integral with a support of said clamping device (10) so as to move said clamping devices (10) as a result of relative movement between the operating head (15) and the work bench (20).

4. A machine tool in accordance with claim 3, wherein said clamping devices (10) secure a workpiece by means of a vacuum.

5. A machine tool in accordance with claim 3, wherein said linear actuator (3) is a pneumatic piston.

6. A machine tool in accordance with claim 3, wherein said linear actuator (3) is a hydraulic piston.

7. A machine tool in accordance with claim 3, wherein said linear actuator (3) is an electric motor.

8. A machine in accordance with claim 1, wherein said sensor means 8 are optical sensors.

9. A machine in accordance with claim 1, wherein said sensor means are inductive sensors.

* * * * *